United States Patent [19]

Tsuda et al.

[11] Patent Number: 5,440,267

[45] Date of Patent: Aug. 8, 1995

[54] DEMODULATOR

[75] Inventors: Hiroki Tsuda; Motoya Iwasaki, both of Tokyo, Japan

[73] Assignee: NEC Corporation, Tokyo, Japan

[21] Appl. No.: 305,888

[22] Filed: Sep. 14, 1994

[30] Foreign Application Priority Data

Sep. 14, 1993 [JP] Japan ................. 5-252226

[51] Int. Cl.$^6$ .............................. H03D 3/00
[52] U.S. Cl. ................... 329/308; 329/309; 375/332; 375/362; 375/376
[58] Field of Search .............. 329/304, 305, 306, 307, 329/308, 309, 310; 375/52–57, 80–87, 97, 111, 114, 116, 120; 360/28–30, 51

[56] References Cited

U.S. PATENT DOCUMENTS 4,888,793 12/1989 Chanroo et al. ................... 395/84

FOREIGN PATENT DOCUMENTS 3-131149 6/1991 Japan .

OTHER PUBLICATIONS

R. Yamamoto et al., "A Clock Recovery Circuit Using Geometric Character of Preamble", The 1993 IEICE Spring Conference, B-316.
A. Blanchard, "Phase–Locked Loops", A Wiley–Interscience publication, John Wiley & Sons, 1976, pp. 280–289.

*Primary Examiner*—David Mis
*Attorney, Agent, or Firm*—Sughrue, Mion, Zinn, Macpeak & Seas

[57] ABSTRACT

In a demodulator, a delay detection means receives a $\pi/4$-shift QPSK signal and performs delay detection of a signal at an interval of symbols. An averaging circuit respectively averages two channel quadrature signal components of a signal. A preamble detection means detects a preamble having a specific pattern in which a phase shift of $\pi/4$ of the phase of a received symbol from the immediately preceding symbol and a phase shift of $-3\pi/4$ of a phase of a next symbol from the immediately preceding symbol are alternately repeated on a phase plane of the two channel quadrature signal components. A phase angle calculating means calculates the phase angle of an output signal from the averaging circuit. A frequency offset estimating circuit calculates a carrier frequency offset. A voltage-controlled oscillator has an output oscillation frequency variably controlled by an output signal from the frequency offset estimating circuit. A frequency converter performs frequency conversion of the output oscillation frequency of the voltage-controlled oscillator and the input $\pi/4$-shift QPSK signal. A reproduction circuit reproduces a carrier and a clock from an output $\pi/4$-shift QPSK signal from the frequency converter, and obtains demodulated data by coherent detection.

4 Claims, 6 Drawing Sheets

DEMODULATOR

BACKGROUND OF THE INVENTION

The present invention relates to a demodulator and, more particularly, to a demodulator for acquiring a carrier frequency for a π/4-shift QPSK signal in satellite communications.

Both quadriphase shift keying (QPSK) and π/4-shift QPSK are digital signal modulation schemes, in which two carriers, for binary digital signals of two series, which have a phase difference of 90° with respect to each other are subjected to binary phase shift keying to generate two quadrature-modulated waves, and the waves are added to be output, as a QPSK or quadriphase PSK signal, to a transmission path. In both the schemes, a quaternary signal is transmitted. However, in the π/4-shift QPSK modulation scheme, one of four phase states on the phase plane of two channel quadrature signals is transmitted at a given symbol period, and one of four phase states set by shifting each of the above four phase states on the phase plane by π/4 is transmitted at the next symbol. These transmitting operations are alternately repeated. In this regard, the π/4-shift QPSK is different from the QPSK in which such a shifting operation is not performed.

Figure 8:
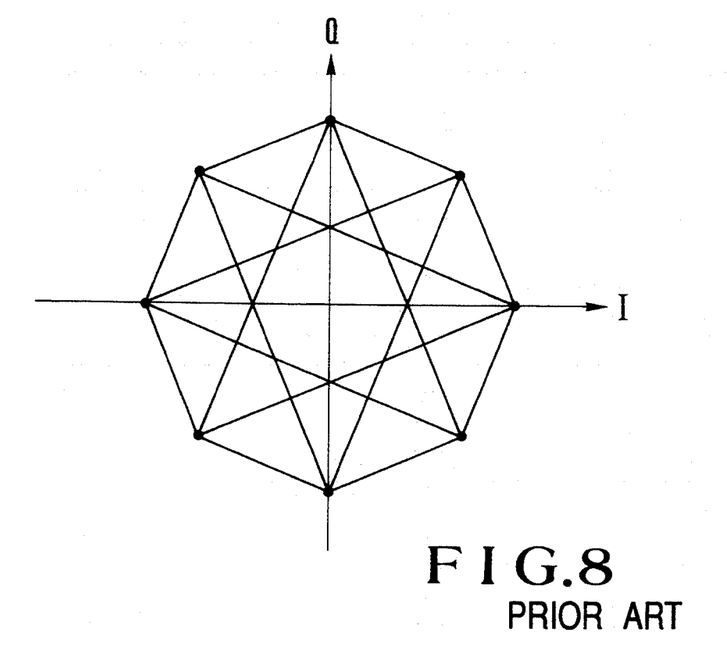
FIG. 8 is a view showing phase states and transitions in a π/4-shift QPSK modulation scheme.

In the π/4-shift QPSK modulation scheme, carrier phase states are represented in the manner shown in FIG. 8. As shown in FIG. 8, the phase states are shifted without passing through the origin of a signal space diagram. For this reason, the overall envelope fluctuations of π/4-shift QPSK are smaller than those of QPSK in which the envelope goes through zero amplitude when both the in-phase and quadrature channel data change phase simultaneously. Therefore, the spread of spectra can be suppressed even with the use of a nonlinear amplifier.

For the above reason, in using a nonlinear amplifier, such as a class "C" amplifier, which can amplify a signal with a high power efficiency and has a simple structure, the π/4-shift QPSK modulation scheme has been conventionally used, which can effectively use a transmission band in accordance with an increase in transmission channel capacity. This π/4-shift QPSK has been mainly employed as a modulation scheme in digital portable telephone and cellular mobile telephone systems, and has also been used in mobile satellite communications.

In satellite communications, coherent detection schemes are usually used for greater link margin, unlike in digital portable telephone and cellular mobile telephone systems. In addition, in satellite communications, a carrier frequency offset is caused by the Doppler effect, drifts caused by a local oscillator on the transmission side or on the transponder of a satellite, residual frequency error by automatic frequency control (AFC), and the like. Especially in mobile terminals and earth stations designed to be reduced in size and price, less stable oscillators in frequency need to be used, inviting greater a carrier frequency offset.

Such a carrier frequency offset poses a serious problem in coherent detection. For this reason, when such a large carrier frequency offset is present, various measures are taken on the receiving side to achieve prompt carrier acquisition. For instance, a known demodulator (e.g., disclosed in Japanese Patent Laid-Open No. 3-131149) is used on the receiver side. This demodulator is designed to acquire a carrier frequency by sweeping the oscillation frequency of a voltage-controlled oscillator in a carrier recovery circuit using a phase-locked loop (PLL).

Figure 9:
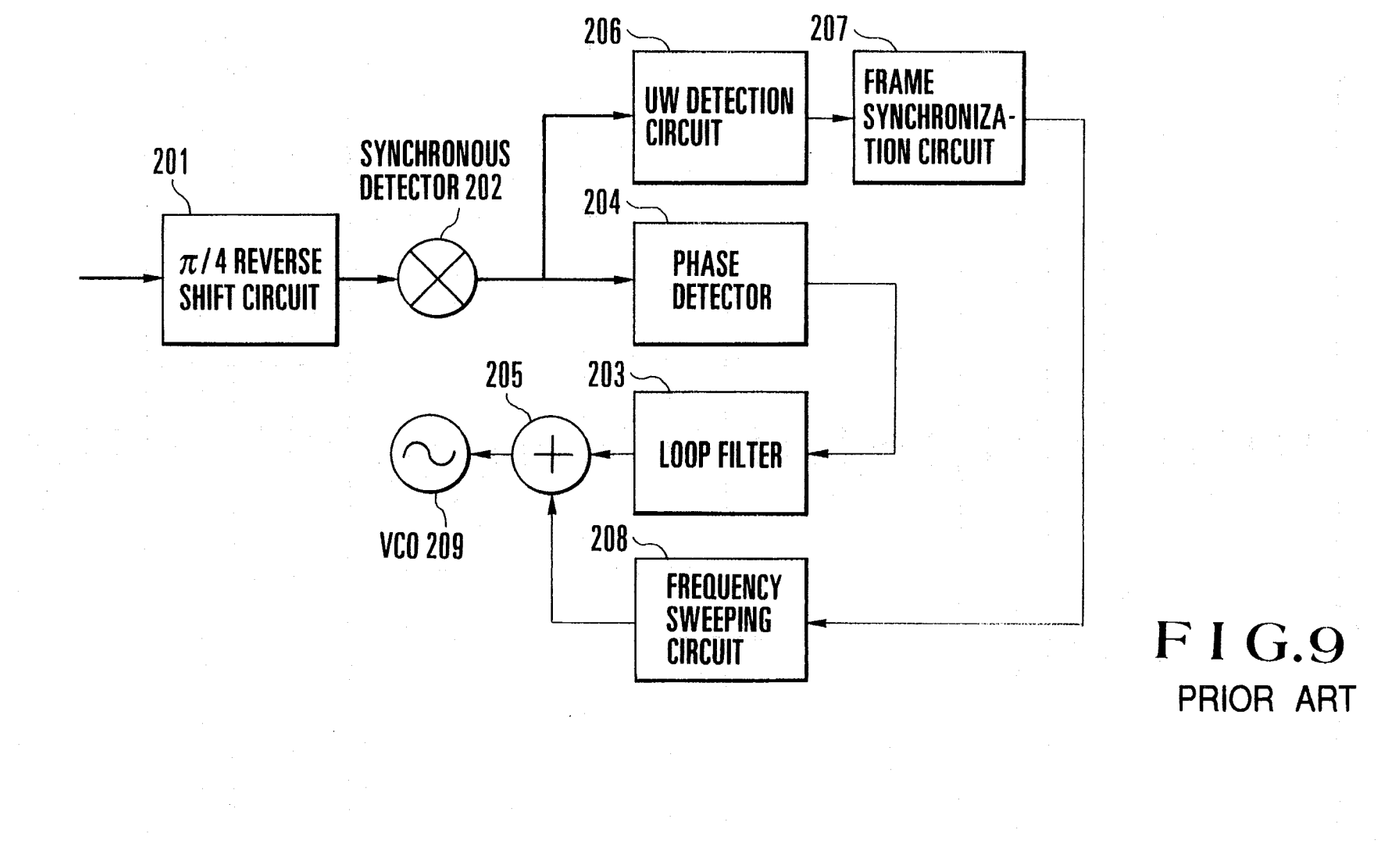
FIG. 9 is block diagram showing an arrangement of a conventional apparatus.

FIG. 9 shows an arrangement of a conventional demodulator. Referring to FIG. 9, the demodulator is basically constituted by a carrier recovery circuit using a phase-locked loop (PLL) constituted by a voltage-controlled oscillator (VCO) 203 for generating a reference carrier, a coherent detector 202 for performing coherent detection of an input signal by using the reference carrier, a phase detector 204 for detecting a phase error between an input signal and the reference carrier, and a loop filter 205 for increasing the signal-to-noise power ratio (S/N) of a recovered carrier. The demodulator also includes a π/4 reverse shifter 201 for shifting the phase of an input π/4-shift QPSK signal by π/4, a unique word (UW) detector 206 for detecting a unique word (synchronizing word or framing) from the data obtained by demodulating the input π/4-shift QPSK signal by means of coherent detection, a frame synchronization circuit 207 for establishing/holding synchronization of a reception frame on the basis of the detected unique word, a frequency sweeping circuit 208 for sweeping the output oscillation frequency of the VCO 203, and an adder 209 for adding an output signal from the loop filter 205 and an output signal from the frequency sweeping circuit 208 and applying the resultant signal, as a control voltage, to the VCO 203.

In this conventional demodulator, a received π/4-shift QPSK signal is input to the π/4 reverse shifter 201, in which the phase of the π/4-shift QPSK signal is reversely shifted by π/4 for two symbols. The shifted signal is input to the coherent detector 202. The coherent detector 202 then demodulated the QPSK signal from the π/4 reverse shifter 201 on the basis of the recovered carrier from the VCO 203, thereby obtaining a demodulated data output of the I- and Q-channel quadrature signals.

This output signal from the coherent detector 202 is supplied to the phase detector 204 to detect the phase error between the output recovered signal from the VCO 203 and the carrier for the QPSK signal from the π/4 reverse shifter 201. The phase error is then filtered by the loop filter 205 and applied, as a control voltage, to the VCO 203 via the adder 209. With this operation, the output oscillation frequency of the VCO 203 becomes a recovered carrier conforming/synchronizing to/with the carrier for the QPSK signal coming out of the π/4 reverse shifter 201 to the coherent detector 202.

In the above PLL, the sweeping circuit 208 is operated when a carrier is to be acquired after the demodulator is started, and a signal obtained by adding an output signal from the frequency sweeping circuit 208 to an output error signal from the loop filter 205 using the adder 209 is applied, as a control voltage, to the VCO 203.

When the output reference carrier frequency of the VCO 203 is swept and falls within the acquisition range of the PLL, the output reference carrier of the VCO 203 is phase-locked to a carrier for an incoming π/4-shift QPSK signal, and the frame synchronization circuit 207 establishes frame synchronization on the basis of a unique word detected by the unique word detector 206 to which demodulated data is input.

The frame synchronization circuit 207 outputs the resultant frame sync signal to the frequency sweeping circuit 208 to stop the frequency sweeping operation of the frequency sweeping circuit 208 and hold its output.

With this operation, according to the conventional demodulator, a carrier frequency is acquired, and demodulation is continued.

According to the above conventional demodulator, in the PLL, a carrier phase is synchronized, and frame synchronization is established from demodulated data, thereby completing acquisition of a carrier frequency. For this reason, the acquisition time is dependent on a carrier phase-locking time in the PLL, clock synchronization time, and a frame length, and needs to be shorter than the time defined by these values. Consequently, it takes time to acquire a QPSK signal.

In the conventional demodulator, in order to perform phase lock including a carrier frequency, the PLL must be constituted by a second-order loop. In this case, in a complete integral second-order PLL, a carrier acquisition time $T_{aq}$ required to synchronize an input signal having a frequency offset $\Delta\omega$ is given by $$T_{aq} \approx \frac{1}{\omega}\left\{5 + \frac{1}{2\lambda}\left(\frac{\Delta\omega}{\omega_n}\right)^2\right\} \quad (1)$$

where $\lambda$ is the damping factor of the loop filter, and $\omega_n$ is the natural angular frequency. It is known that these values and a loop band $B_L$ have the following relationship:

$$\omega_n = \frac{2B_L}{2\lambda + \frac{1}{2\lambda}} \quad (2)$$

Assume that equation (1) is substituted into equation (1), the damping factor $\lambda$ is set to shorten the acquisition time $T_{aq}$, and $\Delta\omega >> B_L$. In this case, the acquisition time $T_{aq}$ is given by $$T_{aq} \approx \frac{5}{B_L} + \frac{0.8\Delta\omega^2}{B_L^3} \quad (3)$$

That is, the acquisition time $T_{aq}$ is increased (prolonged) in proportion to the square of the carrier frequency offset $\Delta\omega$.

Assume that a low carrier-to-noise power ratio (C/N) is required as an input signal condition. In this case, if the loop band $B_L$ is narrowed to increase the signal-to-noise power ratio (S/N) of a recovered carrier, the carrier acquisition time $T_{aq}$ is increased (prolonged) in proportion to the cube of the width of the loop band $B_L$.

SUMMARY OF THE INVENTION

It is an object of the present invention to provide a demodulator which can acquire a carrier frequency in a band wider than that in the prior art, and can perform demodulation by coherent detection within a short period of time.

It is another object of the present invention to provide a demodulator which can obtain a phase vector with high precision even under a low C/N condition.

In order to achieve the above object, according to the present invention, there is provided a demodulator comprising delay detection means for receiving a $\pi/4$-shift QPSK signal as an input signal, and performing delay detection of a signal at an interval of two symbols, an averaging circuit for respectively averaging two channel quadrature signal components of a signal extracted by the delay detection means, preamble detection means for detecting, on the basis of an output signal from the averaging circuit, a preamble having a specific pattern in which a phase shift of $\pi/4$ of a phase of a received symbol from an immediately preceding symbol and a phase shift of $-3\pi/4$ of a phase of a next symbol from the immediately preceding symbol are alternately repeated on a phase plane of the two channel quadrature signal components, phase angle calculating means for calculating a phase angle of an output signal from the averaging circuit when the preamble is detected by the preamble detection means, frequency offset calculating means for calculating a carrier frequency offset from an output phase angle from the phase angle calculating means, variable frequency oscillating means whose output oscillation frequency is variably controlled by an output signal from the frequency offset calculating means, a frequency converter for performing frequency conversion of the output oscillation frequency of the variable frequency oscillating means and the input $\pi/4$-shift QPSK signal, and a reproduction circuit for reproducing a carrier and a clock from an output $\pi/4$-shift QPSK signal from the frequency converter, and obtaining demodulated data by coherent detection.

The preamble of a received $\pi/4$-shift QPSK signal has a specific pattern in which a phase shift of $\pi/4$ of the phase of a received symbol from an immediately preceding symbol and a phase shift of $-3\pi/4$ of the phase of the next symbol from the immediately preceding symbol are alternately repeated on the phase plane of two channel quadrature signal components. Therefore, the phase difference between every pair of symbols becomes $\pi/2$, and the phase angle of a phase vector obtained by delay detection of two symbols varies depending on a carrier frequency offset. According to the present invention, attention is paid to the above phenomenon, and a carrier frequency offset is estimated from the phase angle of this preamble.

In detecting a preamble, an output signal from the delay detection means is supplied to the preamble detection means via the averaging circuit, and the preamble is detected from the magnitude of the phase vector of the signal. In estimating a carrier frequency offset, a phase angle is calculated by the phase angle calculating means from a phase vector output from the averaging circuit, and the carrier frequency offset is calculated/estimated by the frequency offset calculating means on the basis of the phase angle. This estimated frequency offset can be compensated by variably controlling the output oscillation frequency of the variable frequency oscillating means which is subjected to frequency conversion with the input $\pi/4$-shift QPSK signal in the frequency converter.

DESCRIPTION OF THE PREFERRED EMBODIMENT

Figure 1:
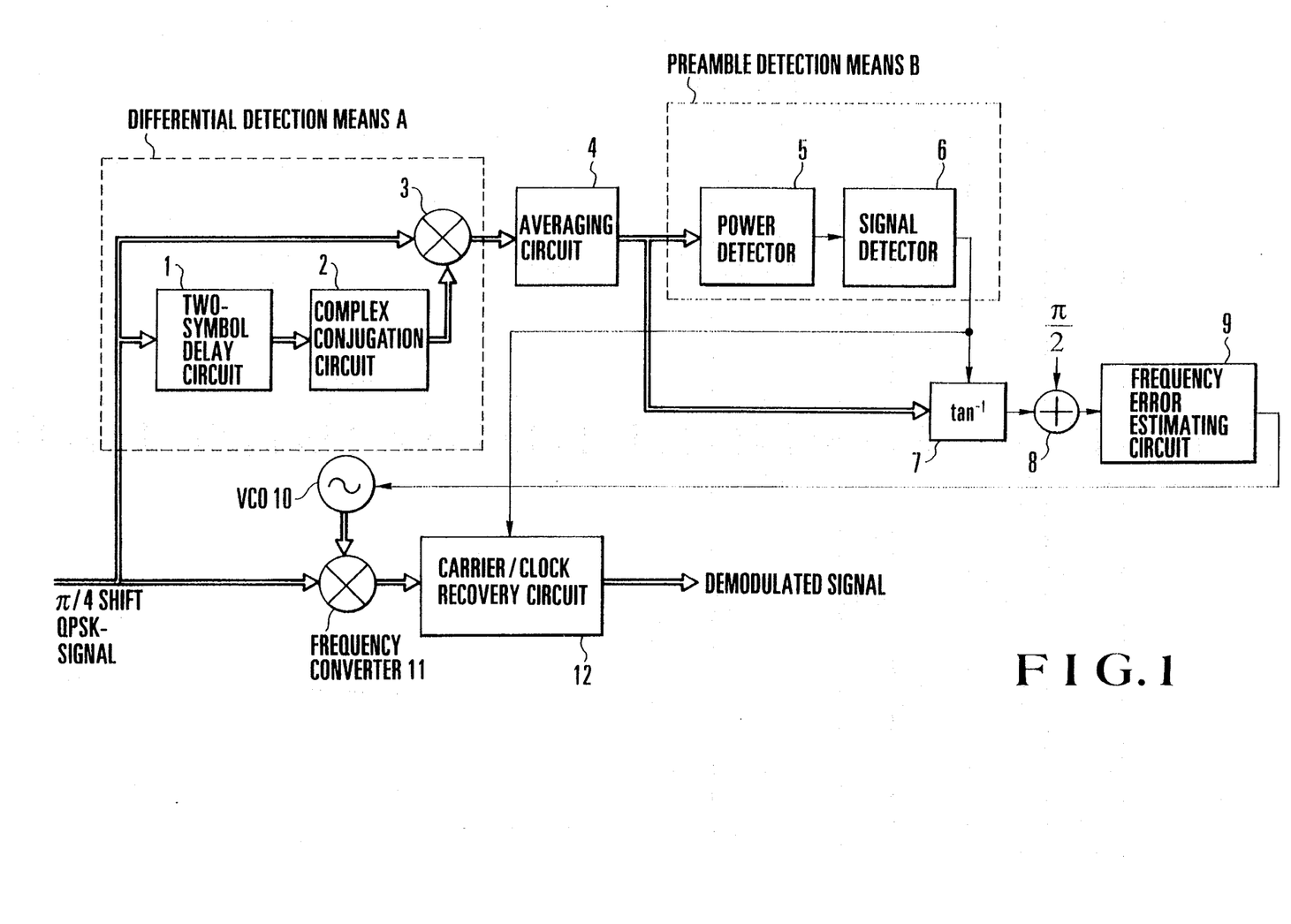
FIG. 1 is a block diagram showing the arrangement of an embodiment of the present invention.

An embodiment of the present invention will be described next. FIG. 1 shows the arrangement of the embodiment. A demodulator of this embodiment is a coherent detection type PSK demodulator for digital satellite communication, which is designed to transmit a π/4-shift QPSK signal. This apparatus is constituted by a two-symbol delay circuit 1, a complex conjugation circuit 2, a detector 3, an averaging circuit 4, a power detector 5, a signal detector 6, an arc tangent calculating circuit 7 for realizing the aforementioned phase angle calculating means, an adder 8, a frequency offset estimating circuit 9, a voltage-controlled oscillator (VCO) as a variable frequency oscillating means, a frequency converter 11, and a carrier/clock reproduction circuit 12.

The two-symbol delay circuit 1, the complex conjugation circuit 2, and the detector 3 constitute a delay detection means A, to which a received π/4-shift QPSK signal is input. The power detector 5 and the signal detector 6 constitute a preamble detection means B. Referring to FIG. 1, the thick lines represent transmission paths for two channel quadrature signal components. A π/4-shift QPSK signal input to this demodulator has a frame format constituted by, e.g., a preamble, a unique word, and data in the order named.

Figure 2:
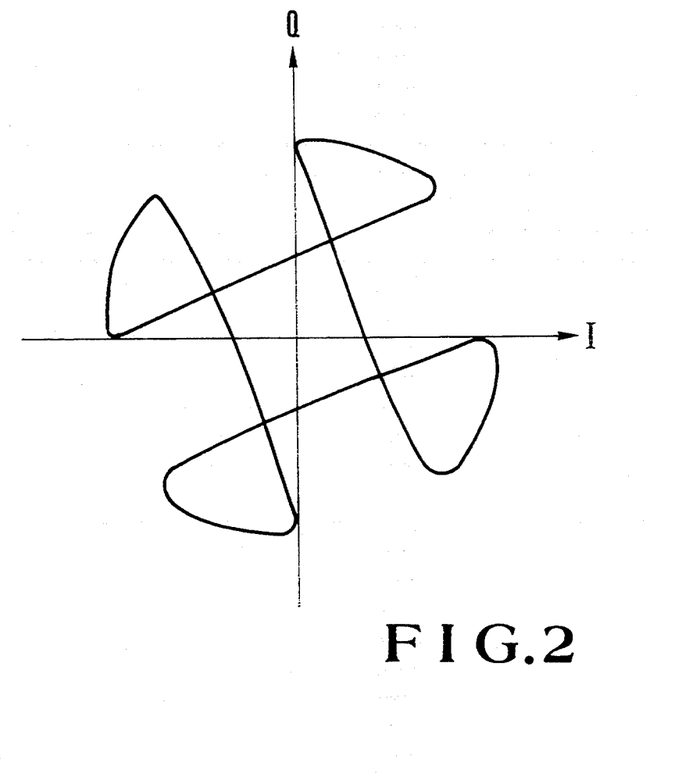
FIG. 2 is a view showing the preamble pattern of a $\pi/4$-shift QPSK signal to which the present invention is applied.

Of these components, the preamble is a specific pattern in which a phase shift of π/4 of the phase of a received symbol from the immediately preceding symbol and a phase shift of −3π/4 of the phase of the next symbol from the immediately preceding symbol are alternately repeated on the phase plane of the two channel quadrature signal components (I- and Q-channel signal components), as shown in FIG. 2. This preamble pattern itself is known (Ryohei Yamamoto and Hiroyuki Otake, "A Clock Recovery Circuit using Geometric Character of Preamble", THE 1993 IEICE SPRING CONFERENCE, B-316). As shown in FIG. 2, the preamble pattern is a repetitive pattern of π/4, π/2, −π/4, 0, −3π/4, −π/2, 3π/4, and π.

Figure 3:
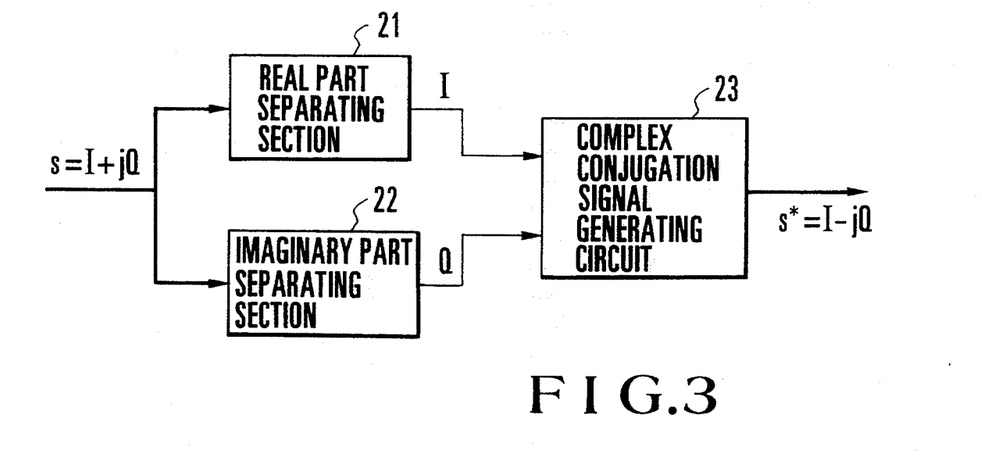
FIG. 3 is a block diagram showing an arrangement of a complex conjugate circuit in FIG. 1.

For example, as shown in FIG. 3, the complex conjugation circuit 2 is constituted by a real part separating section 21, an imaginary part separating section 22, and a complex conjugation signal generating circuit 23. The real part separating section 21 and the imaginary part separating section 22 receive two channel quadrature signal components (I- and Q-channel signal components) of an input π/4-shift QPSK signal. Referring to FIG. 3, the two channel quadrature signal components of the input π/4-shift QPSK signal can be expressed by the following complex number:

$$s(t)=I+jQ=exp[j\{2\pi\Delta ft+\theta(t)\}]$$

Where I is the I-channel signal component (in-phase signal component) and Q is the Q-channel signal component (quadrature signal component).

The real part separating section 21 separates the I-channel signal component from the input signal s(t), while the imaginary part separating section 22 separates the Q-channel signal component from the input signal s(t). The complex conjugate signal generating circuit 23 receives output signals from the real part separating section 21 and the imaginary part separating section 22, inverts the sign of the output signal from the imaginary portion separating section 22, and adds the inverted sign to the output signal from the real part separating section 21, thereby generating and outputting a complex conjugate signal s*(t) represented by the following equation:

$$s^*(t)=I-jQ=exp[-j\{2\pi\Delta ft+\theta(t)\}]$$

Figure 4:
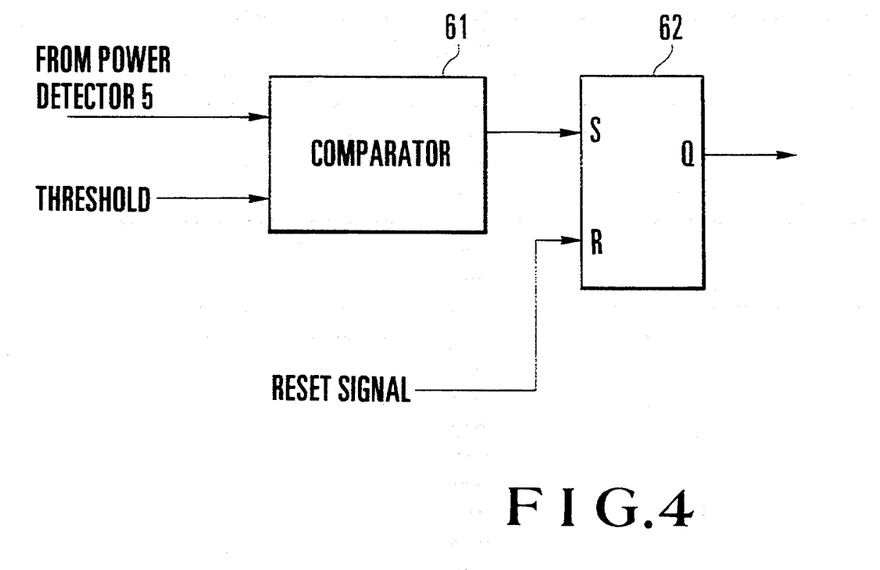
FIG. 4 is a block diagram showing an arrangement of a signal detector in FIG. 1.

As shown in FIG. 4, the signal detector 6 in FIG. 1 is constituted by a comparator 61 and an SR flip-flop 62 having a set terminal to which an output signal from the comparator 61 is supplied. In the signal detector 6, a threshold level is set in the comparator 61 before a signal is received, and at the same time, the SR flip-flop 62 is externally reset to set a standby state for signal detection.

If the level of a power value input from the power detector 5 to the comparator 61 is higher than the set threshold level in this state, a high-level signal is output to set the flip-flop 62. With this operation, the flip-flop 62 is caused to output a high-level signal, as a preamble detection signal, from the Q output terminal. If the level of the input power value is lower than the set threshold level, the comparator 61 outputs a low-level signal to keep the flip-flop 62 in the reset state.

Figure 5:
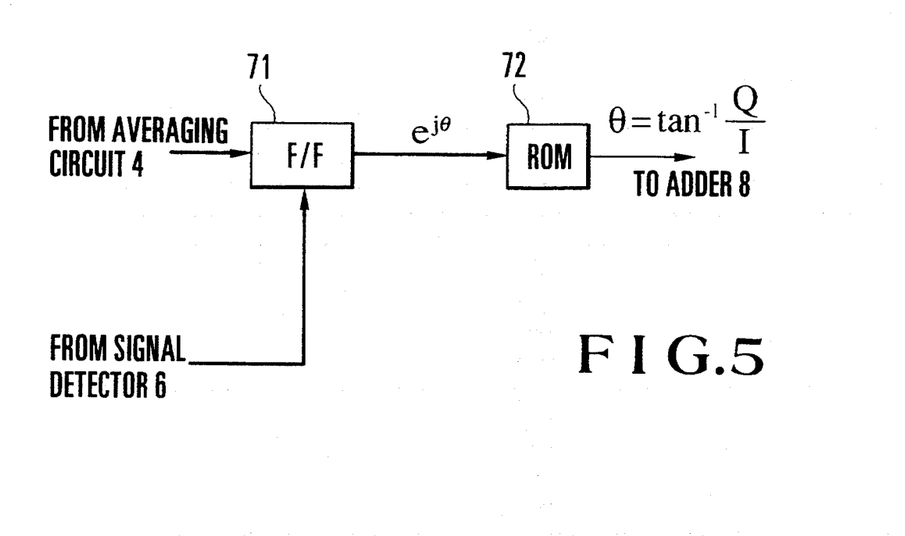
FIG. 5 is a block diagram showing an arrangement of an arc tangent calculating circuit in FIG. 1.

For example, the arc tangent calculating circuit 7 in FIG. 1 has an arrangement like the one shown in FIG. 5. The arc tangent calculating circuit 7 calculates the phase angle of an output phase vector from the averaging circuit 4 when a preamble detection signal is input. As shown in FIG. 5, the arc tangent calculating circuit 7 is constituted by a flip-flop 71 and a read-only memory (ROM) 72. The flip-flop 71 latches an output phase vector from the averaging circuit 4 in response to an output preamble detection signal from the signal detector 6. An output signal from the flip-flop 71 is input to the address terminal of the ROM 72.

The ROM 72 serves to store, in advance, data calculated according to $\theta=\tan^{-1}(Q/I)$, as table data, provided that the I- and Q-channel quadrature signal components of an output signal from the flip-flop 71 as a latch circuit are respectively represented by cos θ and sin θ.

Figure 6:
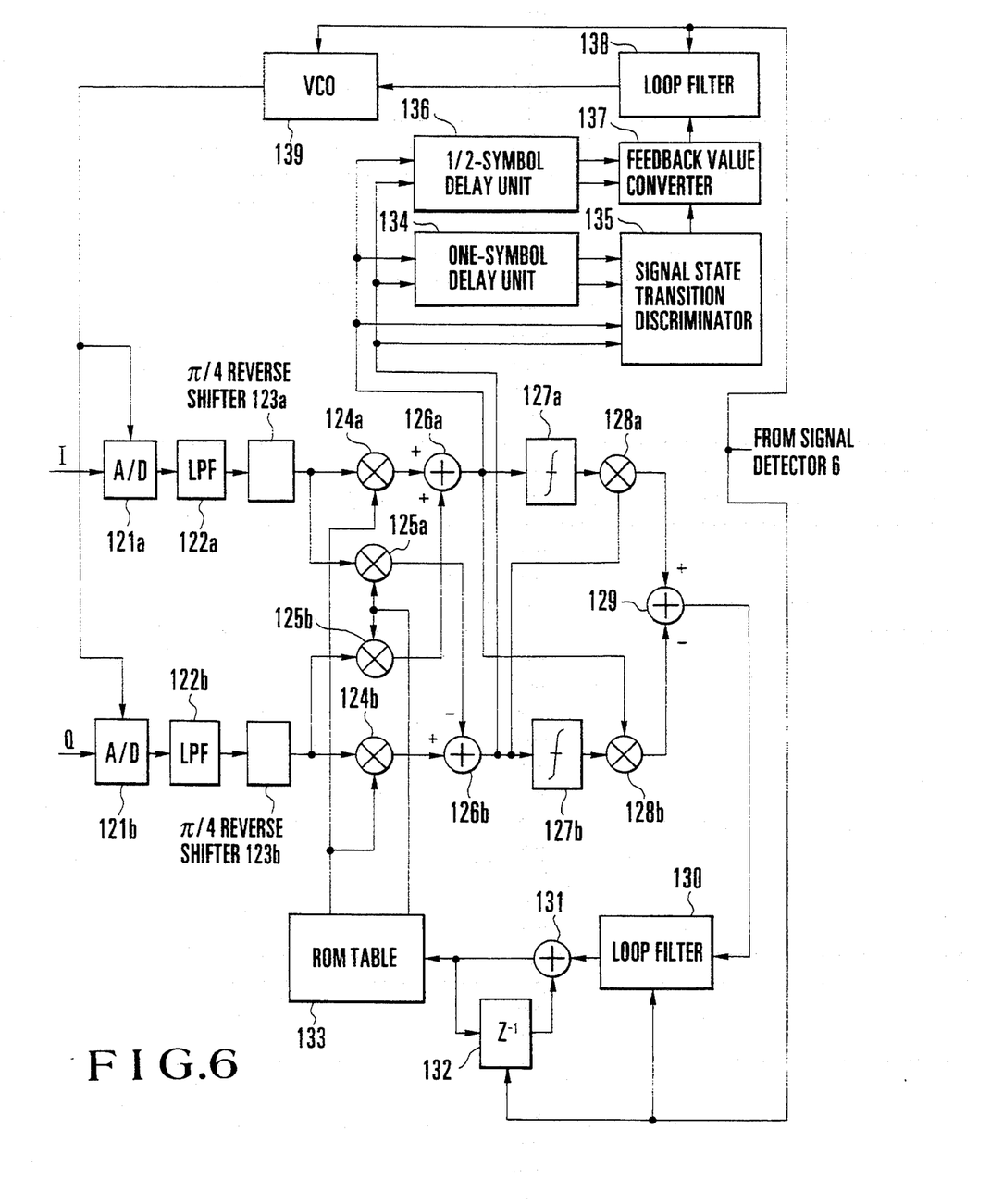
FIG. 6 is a block diagram showing an arrangement of a carrier/clock reproduction circuit.

The carrier/clock reproduction circuit 12 in FIG. 1 has an arrangement like the one shown in FIG. 6. In the carrier/clock reproduction circuit 12, the I-channel signal component of the I- and Q-channel quadrature signal components of a π/4-shift QPSK signal input from the frequency converter 11 is supplied to multipliers 124a and 125a via an A/D converter 121a, a low-pass filter (LPF) 122a, and a π/4 reverse shifter 123a, whereas the Q-channel signal component is supplied to multipliers 124b and 125b via an A/D converter 121b, an LPF 122b, and a π/4 reverse shifter 123b.

The multipliers 124a and 124b respectively multiply a first recovered carrier output from a ROM table 133 by signals whose phases have been reversely shifted by the reverse shifters 123a and 123b. The multipliers 125a and 125b respectively multiply the first recovered carrier and a second recovered carrier having a phase difference of 90° with respect to the first recovered carrier, which are extracted from the ROM table 133, by the signals whose phases are reversely shifted by the reverse shifters 123a and 123b.

Adders 126 and 126b, discriminators 127a and 127b, and multipliers 128a and 128b are arranged on the output sides of the multipliers 124a, 124b, 125a, and 125b. With this arrangement, the coherently detected I- and Q-channel signal components are supplied to an adder 129. A loop filter 130, an adder 131, a delay element 132 having a delay time corresponding to a symbol length, and the ROM table 133 are arranged on the output side of the adder 129.

A one-symbol delay unit 134 delays a demodulated signal by a time corresponding to one symbol clock. A signal state transition discriminator 135 receives the demodulated signal and the output signal from the one-symbol delay unit 134 as input signals, and discriminates the state transition of each signal. A ½-symbol delay unit 136 delays the demodulated signal by a time corresponding to a ½ symbol clock. A feedback value converter 137 converts the output signal from the ½-symbol delay unit 136 into a feedback value by using the output signal from the signal state transition discriminator 135. A loop filter 138 receives the output signal from the feedback value converter 137 as an input signal. A voltage-controlled oscillator (VCO) 139 receives the output signal from the loop filter 138 as a control voltage. With the above components, a reproduction clock synchronizing with a symbol clock for an input signal is generated, together with a clock having a frequency of an even multiple of the frequency of the reproduction clock.

The operation of the embodiment shown in FIG. 1 will be described next. First of all, an input $\pi/4$-shift QPSK signal is input to the frequency converter 11 and also input to the two-symbol delay circuit 1 and the detector 3 in the delay detection means A. If the input $\pi/4$-shift QPSK signal has a carrier frequency offset $\Delta f$, the wave is expressed by the following equation:

$$s(t) = exp[j\{2\pi\Delta f \cdot t + \theta(t)\}] \qquad (4)$$

for $$\theta(nT) = \pi/4, -\pi/4, -3\pi/4, 3\pi/4 (n=0, 2, 4, 6, \ldots)$$

$$\theta(nT) = \pi/2, 0, -\pi/2, \pi(n=1, 3, 5, 7, \ldots)$$

where T is the symbol period.

This input $\pi/4$-shift QPSK signal s(t) is delayed by the two-symbol delay circuit 1 by a time corresponding to symbols to become a signal s(t−2T) expressed by the following equation:

$$s(t-2T) = exp[j\{2\pi\Delta f \cdot (t-2T) + \theta(t-2T)\}] \qquad (5)$$

This output signal s(t−2T) from the two-symbol delay circuit 1 is supplied to the complex conjugation circuit 2 to become a signal s*(t−2T) expressed by the following equation. In this case, s* represents a complex conjugate of s.

$$s^*(t-2T) = exp]-j\{2\pi\Delta f \cdot (t-2T) + \theta(t-2T)\}] \qquad (6)$$

The detector 3 performs complex multiplication of the input $\pi/4$-shift QPSK signal expressed by equation (4) and the complex conjugate signal s*(t−2T) expressed by equation (6), and outputs a detection signal expressed by the following equation:

$$s(t) \cdot s^*(t-2t) = exp[j\{2\pi\Delta f 2T + \theta(t) - \theta(t-2T)\}] \qquad (7)$$

In this case, since the phase of the preamble is shifted during a preamble input period of the $\pi/4$-shift QPSK signal s(t), the phase difference between the currently received symbol and a symbol received symbols ahead thereof is expressed as follows:

$$\theta(t) - \theta(t-2T) = -\pi/2 \qquad (8)$$

Therefore, an output signal from the detector 3 during a preamble input period is expressed as follows by substituting equation (8) into equation (7).

$$s(t) \cdot s^*(t-2T) = exp[j\{2\pi\Delta f 2T - \pi/2\}] \qquad (9)$$

Figure 7:
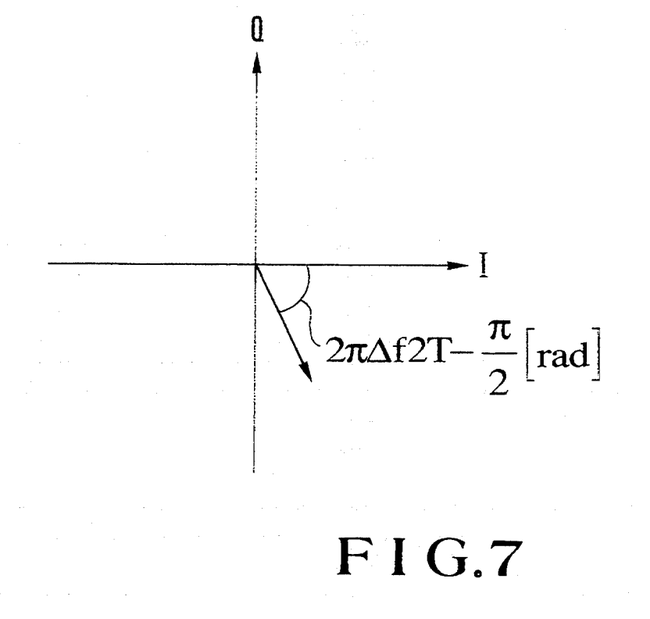
FIG. 7 is a graph showing a delay detection output phase vector during reception of a preamble.

The phase angle of the output signal from the detector 3 during the preamble input period is expressed as $(2\pi\Delta f 2T - \pi/2)$ according to equation (9), and is expressed as a phase vector like the one shown in FIG. 7 on a phase plane. It is, therefore, apparent that this phase angle varies depending on only the carrier frequency difference $\Delta f$.

This output signal from the detector 3 is supplied to the averaging circuit 4, in which the in-phase and quadrature components are respectively integrated for a predetermined period of time corresponding to N symbols. Thereafter, each resultant integral value is multiplied by 1/N to be averaged. This operation is performed to increase the signal-to-noise power ratio (S/N) so as to be obtain a phase vector with a high precision even under a low carrier-to-noise power ratio (C/N) condition.

The phase vectors averaged by the averaging circuit 4 are supplied to the power detector 5, in which the magnitudes of the phase vectors are calculated. The signal detector 6 compares each calculation result with a predetermined threshold level. If the magnitude of the input phase vector exceeds the threshold level, the signal detector 6 determines that a preamble is detected, and inputs a preamble detection signal to the arc tangent calculating circuit 7, thereby causing the circuit 7 to start estimation of a carrier frequency offset.

In the arc tangent calculating circuit 7, when an output signal from the flip-flop 71 shown in FIG. 5 is input to the address terminal of the ROM 72, the ROM 72 outputs the data of 8 as a phase angle given by equation (9) by referring to the storage table according to the I- and Q-channel quadrature signal components of the output signal input from the flip-flop 71 to the address terminal of the ROM 72.

Referring to FIG. 1 again, the phase angle data during the preamble input period, which is extracted by the arc tangent calculating circuit 7 and represented by $(2\pi 66 f 2T - \pi/2)$, is input to the adder 8 to be added to $\pi/2$ so as to become a phase $\phi$, in the following equation, which corresponds to a carrier frequency offset.

$$\phi = 2\pi\Delta f 2T = 4\pi T\Delta f \qquad (10)$$

The output signal (phase $\phi$) from the adder 8 is supplied to the frequency offset estimating circuit 9, and a calculation is performed according to the following equation:

$$\Delta f = \phi/(4\pi T) \qquad (11)$$

As a result, the carrier frequency offset $\Delta f$ during the preamble input period is calculated. This carrier frequency offset $\Delta f$ extracted by the frequency offset estimating circuit 9 is applied, as a control voltage, to the VCO 10 to variably control its output oscillation frequency. With this operation, the output oscillation frequency of the VCO 10 is controlled to be a frequency obtained by compensating for the carrier frequency offset Δf during the preamble input period.

In the frequency converter 11, the output oscillation frequency of the VCO 10 is subjected to frequency conversion in accordance with the input π/4-shift QPSK signal, thereby canceling out the carrier frequency offset in the π/4-shift QPSK signal. This π/4-shift QPSK signal is supplied to the carrier/clock reproduction circuit 12. As described above, the carrier/clock reproduction circuit 12 has the arrangement shown in FIG. 6.

Referring to FIG. 66, the adders 124a and 124b respectively add the first recovered carrier output from the ROM table 133 to signals obtained by reverse shift operations of the reverse shifters 123a and 123b. The multipliers 125a and 125b respectively multiply the second recovered carrier extracted from the ROM table 133 and having a phase difference of 90° with respect to the first recovered carrier by signals whose phase shifts have been eliminated by the reverse shifters 123a and 123b for every one symbol period.

The adder 126a adds the output products from the multipliers 124a and 125b. The adder 126b subtracts the output product from the multiplier 124b from the output product from the multiplier 125a. The output signals from the adders 126a and 126b are respectively supplied to the multipliers 128a and 128b via the discriminators 127a and 127b to be added to the output signals from the adders 126b and 126a of the other system. The output signals from the multipliers 128a and 128b are added by the adder 129 while the sign of the other signal is inverted (i.e., the output signals are subtracted from each other) to obtained an error signal.

This error signal is input to the ROM table 133 via a circuit constituted by the loop filter 130, the adder 131, and the delay element 132. As a result, a carrier conforming to the carrier for the input signal is output from the ROM table 133.

Meanwhile, the I- and Q-channel demodulated signals respectively extracted from the adders 126a and 126b are supplied to the one-symbol delay unit 134, the signal state transition discriminator 135, and the ½-symbol delay unit 136. The signal state transition discriminator 135 receives the input demodulated signals, as input signals, which have a time difference corresponding to one symbol clock, and generates a discrimination signal indicating whether a state transition has occurred between the signals. The signal state transition discriminator 135 then supplies this discrimination signal to the feedback value converter 137.

If it is determined from the state transition discrimination signal that a state transition has occurred, the feedback value converter 137 inverts the phase of the demodulated signal delayed by a time corresponding to a ½ symbol clock and input from the ½-symbol delay unit 136. The feedback value converter 137 then outputs the resultant signal as a clock phase error from the zero-crossing point. If it is determined that no state transition has occurred, the feedback value converter 137 outputs a signal for holding the clock phase.

The output signal from the feedback value converter 137 is applied, as a control voltage, to the VCO 139 via the loop filter 138. In this manner, the output signal from the VCO 139 becomes a clock synchronizing with a symbol clock for an input modulated signal. That is, the output signal becomes a reproduction clock. This reproduction clock extracted from the VCO 138 is supplied, as an A/D conversion clock, to the A/D converters 121a and 121b.

In this manner, a carrier and a clock are reproduced from a π/b 4-shift QPSK signal in the carrier/clock reproduction circuit 12, and the modulated signal is demodulated by coherent detection. As a result, a demodulated signal (demodulated data) is extracted.

As described above, according to this embodiment, the carrier frequency offset Δf is estimated by using a preamble, and a modulated wave obtained by compensating for the carrier frequency offset Δf is input to the carrier/clock reproduction circuit 12. With this operation, a carrier and a clock are reproduced, and the modulated signal is demodulated by coherent detection. Therefore, in the carrier/clock reproduction circuit 12, a carrier frequency can be acquired without sweeping the output oscillation frequency of the VCO of the phase-locked loop.

As has been described above, according to the present invention, the phase angle of the phase vector of the preamble of an input π/4-shift QPSK signal is calculated, and a carrier frequency offset is calculated/estimated by the frequency offset calculating means on the basis of this phase angle. In the frequency converting means, the input π/4-shift QPSK signal and the output oscillation frequency of the variable frequency oscillating means subjected to frequency conversion are variably controlled in accordance with the estimated carrier frequency offset. With this operation, the carrier frequency offset in the input π/4-shift QPSK signal is compensated. Therefore, by inputting the π/4-shift QPSK signal, extracted from the frequency converter, to the carrier/clock reproduction circuit, a carrier frequency can be acquired in a band wider than a band in a conventional apparatus, and demodulation by coherent detection can be performed within a short period of time. In addition, since a delay detection signal is averaged by the averaging circuit, a phase vector can be obtained with high precision even under a low C/N condition.

What is claimed is:

1. A demodulator comprising:
    delay detection means for receiving a π/4-shift QPSK signal as an input signal, and performing delay detection of a signal at an interval of symbols;
    an averaging circuit for respectively averaging two channel quadrature signal components of a signal extracted by said delay detection means;
    preamble detection means for detecting, on the basis of an output signal from said averaging circuit, a preamble having a specific pattern in which a phase shift of π/4 of a phase of a received symbol from an immediately preceding symbol and a phase shift of −3π/4 of a phase of a next symbol from the immediately preceding symbol are alternately repeated on a phase plane of the two channel quadrature signal components;
    phase angle calculating means for calculating a phase angle of an output signal from said averaging circuit when the preamble is detected by said preamble detection means;
    frequency offset calculating means for calculating a carrier frequency offset from an output phase angle from said phase angle calculating means;

variable frequency oscillating means whose output oscillation frequency is variably controlled by an output signal from said frequency offset calculating means;

a frequency converter for performing frequency conversion of the output oscillation frequency of said variable frequency oscillating means and the input $\pi/4$-shift QPSK signal; and a reproduction circuit for reproducing a carrier and a clock from an output $\pi/4$-shift QPSK signal from the frequency converter, and obtaining demodulated data by coherent detection.

2. An apparatus according to claim 1, wherein said delay detection means comprises a two-symbol delay circuit for delaying the received $\pi/4$-shift QPSK signal by a time corresponding to two symbols, a complex conjugation circuit for obtaining a complex conjugate of an output signal from said two-symbol delay circuit, and a detector for performing complex multiplication of the received $\pi/4$-shift QPSK signal and an output signal from said complex conjugation circuit.

3. An apparatus according to claim 1, wherein said preamble detection means comprises a power detector for calculating a magnitude of a phase vector of an output signal from said averaging circuit, and a signal detector for detecting the preamble by comparing an output signal from said power detector with a predetermined threshold level.

4. An apparatus according to claim 1, wherein said phase angle calculating means comprises a latch circuit for latching an output signal from said averaging circuit in response to a preamble detection signal from said signal detector, a memory, having address terminals to which two channel quadrature signal components I and Q of an output signal from said latch circuit are input, for outputting data of $\theta$ as the phase angle by referring to data calculated according to $\theta = \tan^{-1}(Q/I)$ provided that the two input channel quadrature signal components I and Q are expressed as $I = \cos\theta$ and $Q = \sin\theta$.

* * * * *

UNITED STATES PATENT AND TRADEMARK OFFICE
CERTIFICATE OF CORRECTION

PATENT NO. : 5,440,267
DATED : August 8, 1995
INVENTOR(S) : Hiroki Tsuda, et al.

It is certified that error appears in the above-indentified patent and that said Letters Patent is hereby corrected as shown below:

Column 8, line 53, delete "$2\pi 66f$" and insert --$2\pi\Delta f$--.

Signed and Sealed this

Sixth Day of August, 1996

Attest:

BRUCE LEHMAN

*Attesting Officer*  *Commissioner of Patents and Trademarks*